United States Patent [19]
Sadler, Jr.

[11] 3,716,129
[45] Feb. 13, 1973

[54] ACCUMULATING LIVE ROLLER CONVEYOR

[76] Inventor: Albert Corneil Sadler, Jr., 147 Lazard, Mount Royal, Quebec, Canada

[22] Filed: April 22, 1971

[21] Appl. No.: 136,516

[52] U.S. Cl..............................................198/127
[51] Int. Cl..............................................B65g 13/02
[58] Field of Search......................198/127, 160, 203

[56] References Cited

UNITED STATES PATENTS 3,136,406  6/1964  DeGood et al.....................198/127 R
3,621,982  11/1971  Fleischauer........................198/127 R

*Primary Examiner*—Richard E. Aegerter
*Attorney*—Fetherstonhaugh & Co.

[57] ABSTRACT

Several groups of transport rollers and a depressible sensing roller (between every two adjacent groups) of transport rollers constitute an article supporting bed of the conveyor, which bed is divided into a plurality of successive zones each containing one group of transport rollers and one sensing roller. A plurality of driving belts constantly engage the group of transport rollers in the respective zones, and separate driving means independently propel the several driving belts from a common drive source. Each zone is provided with control means, responsive to depression of the sensing roller in that zone by passage of an article thereover, to disengage the driving means of the driving belt in the next preceding zone until the depressed sensing roller in the following zone is raised after passage of the article thereover.

14 Claims, 6 Drawing Figures

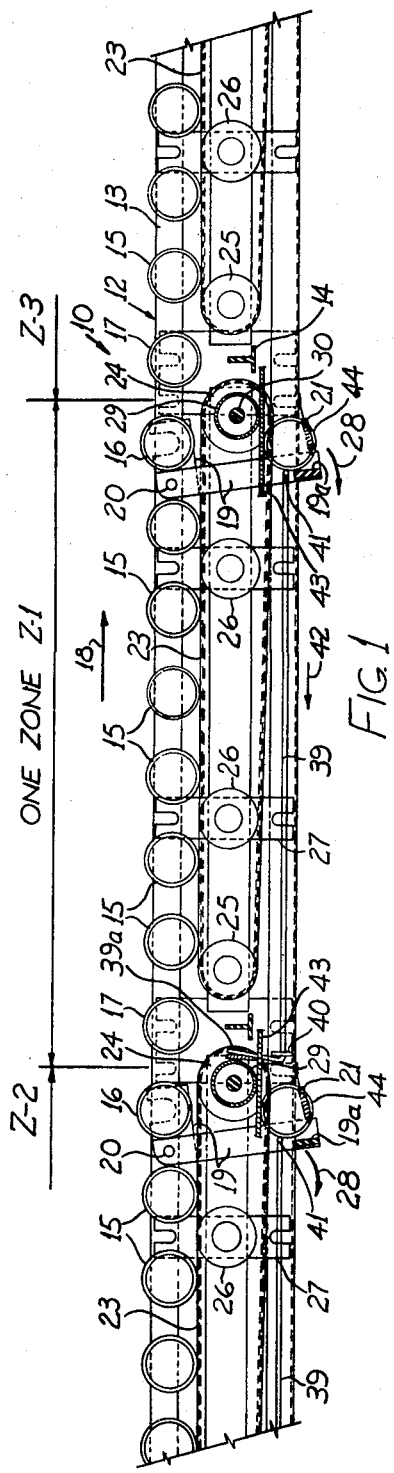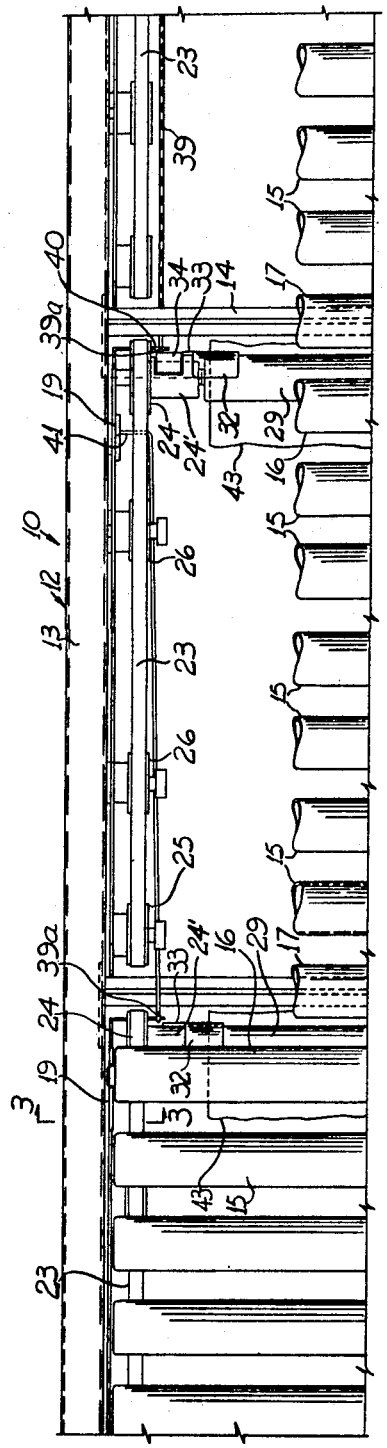

INVENTOR
Albert Corneil SADLER, JR.

Fetherstonhaugh & Co.
PATENT AGENTS

ACCUMULATING LIVE ROLLER CONVEYOR

This invention relates to new and useful improvements in live roller conveyors, and particularly the invention concerns itself with live roller conveyors of the so-called accumulating type.

In live roller conveyors the article transporting rollers are power-driven, and it often happens that the passage of an article along the conveyor is stopped, either accidentally by some obstruction or purposely as for example when the article arrives at some work station where temporary stoppage of the article is necessary in order to perform some type of work thereon.

In conventional practice, even a temporary stoppage of an article on a live roller conveyor has resulted in the piping up or accumulation of subsequent articles against the stopped article, and this has produced not only an undesirable congestion at the work station or at the point of blockage, but also an excessive drag on the propelling mechanism of the conveyor, thus causing premature wear and unnecessary breakdowns in operation as well as damage to the conveyed item.

In recognition of these difficulties, the prior art has endeavored to provide live roller conveyors of the so-called accumulating type in which the article supporting and transporting bed of the conveyor is divided into a plurality of successive zones and means are provided in each zone for sensing the passage of an article therethrough and de-activating the power drive of the next preceding zone so that until an article has passed through one zone, a subsequent article cannot pass through the preceding zone. This arrangement works out remarkably well in that it affords an intermittent flow of articles in spaced apart relation along the conveyor and thus prevents piling up of articles against one which has been accidentally or purposely stopped. In other words, although the conveyor is live or power driven, in the event of an article stoppage the de-activation of one or more of the conveyor zones facilitates accumulation of several articles on the conveyor in spaced apart relation and at a standstill, until the stopped article has resumed its movement. In this context the conveyor is of the accumulating type, as already noted.

The live rollers of the conveyor are usually driven by an endless belt which engages the underside of the rollers, and in conventional accumulating type of conveyors as outlined above, the practice has been to provide means for disengaging the driving belt from the rollers in one zone so as to de-activate such rollers until an article has passed over the sensing roller in the next following or "downstream" zone. In the meantime the driving belt must actuate the transport rollers in all zones except those in the zone which has been stopped. As a practical matter, each zone may have a length of 2 or 3 feet and may contain six, nine or more transport rollers. The driving belt spans the several zones of the conveyor, so in each zone, in accordance with conventional practice, it is necessary to bring a 2 or 3 foot length of the belt in driving engagement with six, nine or more of the rollers in that zone and, conversely, to disengage that length of the belt from that many rollers when the flow of an article through that zone is to be stopped. This presents many difficulties in that complicated and expensive means have to be utilized for shifting the driving belt in and out of engagement with the rollers in the respective groups, and even when that is accomplished with reasonable satisfaction, the action is not necessarily uniform with varying sized packages and becomes more complex as the package shapes and weight range increase. The first attempted solution of this problem was to mount the rollers supporting the main drive belt on pivots and to cause the package weight to pivot the rollers and thus the belt out of drive engagement. The means used to hold the rollers and belt in drive was either a spring or a counterweight. The force exerted by this means governed the drive force on the conveyor, however, it also governed the weight required to sense the package presence. In practice it is necessary to set the system to handle the heaviest packages (maximum spring force) and consequently lighter packages would hang up on the sensing roller (unable to depress) and/or would develop line pressure (return to constant drive state).

To solve this problem many variations of the same theme were attempted including auxiliary sources of force to operate the pivot linkages.

It was obvious from the above discussion that the sense roller and the support rollers could not be interconnected and that the linkage must be broken.

A solution was found to this problem. The support rollers were fixed mounted. They were made with a flat side and the rollers were stopped and with the flat side up to lower the drive belt. This itself introduced problem of noise and sluggish response. Each roller had a stop pin which could be engaged by a linkage connected to the sense roller. As every package passed over each sense roller each pressure roller was stopped. This produces an undesirable noise level. The roller stops with the belt lowered the only force exerted on the roller attempting to start it when released was the belt weight. This would eventually start the roller but response was sluggish.

Further still, when the disengaged belt portion in the stopped zone is brought back into driving engagement with the rollers in that zone, the displacement characteristics of the belt do not assure immediate maximum uniform driving of all the rollers in that zone and thus another minimization of efficiency arises from not utilizing uniform drive of all the rollers.

This system was an improvement of the first designs, but it was still not sensitive to light loads because a certain amount of force was required to disengage the linkage from the roller still under some power in the stop position.

The principal object of the present invention is to eliminate the aforementioned disadvantages of conventional accumulator type conveyors and to provide a conveyor of this type which is highly efficient in operation, simple in construction, and adaptable to economical manufacture. This object is attained by providing each zone of the conveyor with a separate driving belt which constantly engages the transport rollers in that zone, even when the belt and the rollers are stationary. The several driving belts are independently propelled by separate driving means from a common drive source such as a main driving belt which extends over the several zones of the conveyor, the separate driving means in each zone including a clutch actuated by the sensing roller in the next following or downstream zone. Thus, when an article passes over the sensing roller in one zone, the clutch disengages the drive to the transport roller driving belt in the next preceding or upstream zone and the transport rollers in that zone cease to be driven although their driving belt still remains in engagement therewith.

The advantages of this arrangement are manifold. First, it is not necessary to provide means for deflecting a portion of a long driving belt in and out of engagement with transport rollers in individual zones, and thus complicated belt deflecting means used in the prior art are eliminated. Second, by avoiding belt deflection or shifting, the invention safeguards against the possibility of some transport rollers being driven when they should not be, or not being driven when they should be. In the same context, by providing a separate driving belt for the transport rollers in each zone and maintaining that belt in engagement with these rollers at all times, the invention assures that all the transport rollers in each zone are either uniformly driven or at a standstill. Also, the use of a mechanical clutch in the belt driving means of each zone is a much simpler and more effective expedient than that of shifting portions of a long belt in and out of engagement with transport rollers in the different zones, because its operation does not produce an undesirable noise level and because its operation can be made sensitive to a light load and quickly responsive to activation.

With the foregoing more important object and features of the invention in view and such other objects and features which may become apparent as this specification proceeds, the invention will be understood from the following description taken in conjunction with the accompanying drawings, in which like characters of reference are used to designate like parts, and in which:

FIG. 1 is a fragmentary longitudinal sectional view of a conveyor in accordance with the invention;

FIG. 2 is a fragmentary plan view thereof with certain parts broken away;

Figure 3:
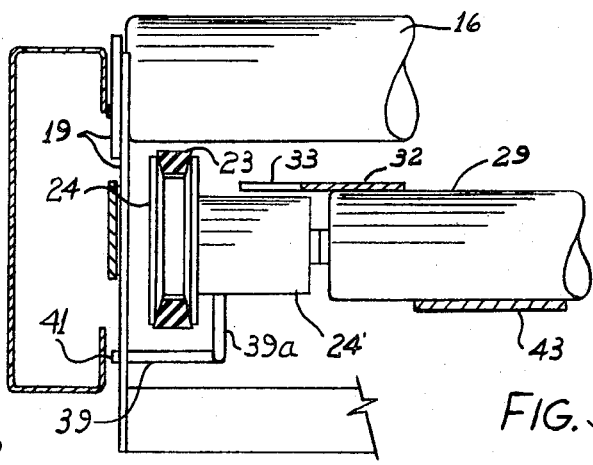
FIG. 3 is a fragmentary sectional detail, taken substantially in the plane of the line 3—3 in FIG. 2.

Referring now to the accompanying drawings in detail, the accumulator type live roller conveyor of the invention is designated generally by the reference numeral 10 and, as shown in FIGS. 1 and 2, it comprises an elongated supporting frame 12 which is suitably fabricated from angle iron and strap iron components either welded or bolted together. The detailed structure of the frame need not be described, but it is to be noted that it includes a pair of longitudinal side members 13 which are transversely spaced and connected together by cross braces 14. Conveniently, the side members 13 may consist of opposing channels of the cross-section shown in FIG. 3.

The article supporting and transporting bed of the conveyor is constituted by rotatable rollers arranged in groups so that the overall length of the conveyor bed is divided into a plurality of successive zones, each of which may be two or three feet long. The conveyor structure in each zone is the same, and thus a description of the structural arrangement in one zone will suffice for all.

The longitudinal span of one zone is indicated at Z-1 in FIG. 1 and the article supporting and transporting bed of the conveyor spanned by the one zone is constituted by a group of transport rollers 15 which are positively driven, a sensing roller 16 which is located at the downstream end of the group of rollers 15, and an idler roller 17 which fills up space between the leading roller 15 in the group and the sensing roller 16 in the next preceding or upstream conveyor zone. In this regard it may be noted that the flow of articles on the conveyor is in the direction of the arrow 18 in FIG. 1 so that in relation to the zone Z-1 there is a next preceding or upstream zone Z-2. Conversely, in relation to the zone Z-2, there is a next following or downstream zone Z-1. In the same context, in relation to the zone Z-1, there is a next following or downstream zone Z-3.

The rollers 15 and 17 extend transversely across the full width of the conveyor bed and are rotatably journalled in upper flanges of the channel-shaped side members 13 so that all these rollers are disposed in a common plane. The sensing roller 16 is rotatably supported at its ends by a pair of bell cranks 19 which are pivoted as at 20 to the upper flanges of the side members 13, so that by rocking of the bell cranks on their pivots, the sensing roller 16 may be raised or lowered. Ordinarily, the roller 16 is in a raised position above the common plane or level of the rollers 15, 17, but is depressible to the level of the other rollers when an article on the conveyor passes over the sensing roller. Suitable springs 21 react between the bell cranks 19 and the conveyor frame to bias the sensing roller to its raised position, although these springs may be omitted and the bell cranks be counter-weighted to attain the same result.

The two bell cranks 19 at the opposite ends of the sensing roller 16 are pivoted as at 20 to the two frame side members 13 as already mentioned, and simultaneous rocking movement of the bell cranks is assured by rigidly connecting their lower end portions together by a brace 19a.

The transport rollers 15 are positively driven by an endless belt 23 which constantly engages the underside of these rollers and is trained over a set of sheaves including a driving sheave 24 at one end, an idler sheave 25 at the other end, and intermediate idler sheaves 26. The belt 23 and its sheaves are located only at one side of the conveyor, the sheaves being rotatably mounted on suitable brackets such as for example the brackets 27, secured to the inside of one of the frame side members 13. The sheaves 25 and 26 assure that the upper run of the belt 23 is always in contact with the underside of the transport rollers 15. Preferably, the driving sheave 24 is larger in diameter than the sheave 25, so that the intermediate sheaves 26 supportably engage only the upper run of the belt. When the bell cranks 19 are moved in the direction of the arrow 28 by passage of an article on the conveyor over the sensing roller 16, the sensing roller is depressed to the common level of the rollers 15, 17 and in that position the sensing roller comes into contact with the driving belt 23 so that like the transport rollers 15, the sensing roller is positively driven and assists in propelling the article into the next following or downstream zone of the conveyor, as for example from the zone Z-1 into the zone Z-3, over the idler roller 17.

The driving sheave 24 is disposed adjacent one end of and coaxially with a driving roller 29, the latter having a supporting shaft 30 which is mounted in the conveyor frame and which projects from one end of the roller 29 to also support the driving sheave. As is best shown in FIG. 5, the driving sheave 24 is provided integrally with a hub 24' and suitable anti-friction bearings 31 are provided in the sheave and hub for mounting thereof on the projecting portion of the shaft 30 of the roller 29, which facilitates rotation of the roller 29 independently of the sheave 24.

Figures 4, 5:
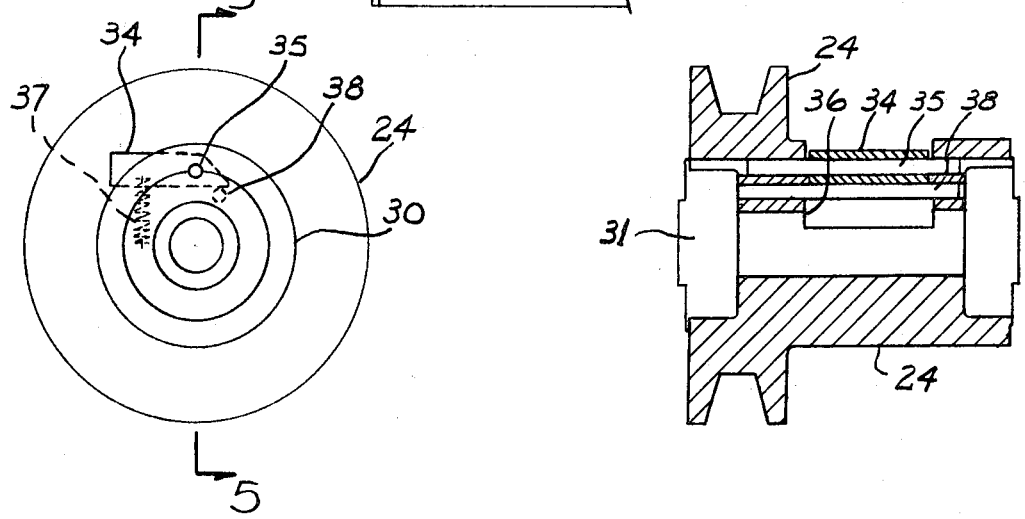
FIG. 4 is an elevational view on an enlarged scale of one of the driving sheaves.
FIG. 5 is a fragmentary sectional view, taken substantially in the plane of the line 5—5 in FIG. 4.
Figure 6:
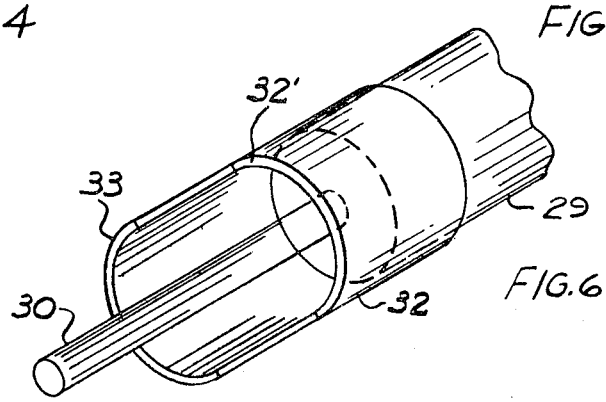
FIG. 6 is a fragmentary perspective view of one of the driving rollers with its clutch detent.

As shown in FIGS. 4–6, the end portion of the roller 29 adjacent the sheave 24 has rigidly secured thereto a sleeve 32 which extends over the sheave hub 24' and is cut away as at 32' to form a semi-tubular detent 33 which constitutes a component of a clutch now to be described. The detent 33 cooperates with another clutch component in the form of a pawl 34 which is pivotally mounted on a pin 35 in a recess 36 formed in the sheave hub 24'. The pawl 34, being carried by the sheave hub 24', is spring-biased by a compression spring 37 to what may be referred to as its projected position in which the pawl abuts a stop pin 38 in the sheave hub, with a portion of the pawl projecting outwardly beyond the circumference of the hub as shown in FIG. 4. The recessed portion of the sheave hub in which the pawl 34 is disposed is overlapped by the semi-tubular detent 33 of the driving roller 29, the arrangement being such that when the pawl is in its projected position it engages the detent and rotation of the roller 29 is transmitted through the clutch components 33, 34 to rotate the sheave 24. However, when the pawl 34 is retracted against the action of the spring 37 into the recess 36 in the sheave hub 24', the clutch components are disengaged and rotation of the driving roller 29 with the detent 33 may continue while the sheave 24 remains stationary.

The clutch control mechanism comprises a push rod 39, one end portion of which is slidable in a bracket 40 affixed to the frame, that end portion of the push rod having an upturned extension 39a which is disposed in close relationship to the sheave hub 24' for cooperation with the pawl 34. The other end of the push rod 39 is connected as at 41 to the bell crank 19 of the next following or downstream zone. Thus for example, the push rod 39 which has its portion 39a adjacent the sheave hub 24' in the conveyor zone Z-2 has its other end connected at 41 to the bell crank 19 in the zone Z-1. In this manner, when the sensing roller 16, for example in the zone Z-1, is depressed by passage of an article thereover, its depression is translated by rocking movement of the bell crank 19 in zone Z-1 to slide the push rod 39 in zone Z-1 rearwardly in the direction of the arrow 42 for disengaging the clutch drive between the roller 29 and the sheave 24 in the next preceding or upstream zone Z-2. The clutch disengagement occurs when the rod 39 is slid rearwardly so that its portion 39a contacts the pawl 34 and presses it into the hub recess 36, whereby the pawl is retracted from its engagement with the detent 33 and the roller 29 may continue to rotate while the sheave 24 is stationary. Of course, when the push rod 39 returns to its initial position, which is that in which the sensing roller 16 in the next following or downstream zone is raised, the rod portion 39 a moves away from the sheave hub 24' and the pawl 34 is projected by the spring 37 into engagement with the detent 33, thus establishing drive from the roller 29 to the sheave 24.

It may be noted that the parts are so proportioned that in the axial direction the detent 33 extends only over a portion of the width of the pawl 34, thus leaving the remaining portion of the pawl unobstructed for contact by the push rod portion 39a, without interfering with the detent 33.

The roller 29 is positively and constantly driven by a main driving belt 43 which passes over rollers 44 rotatably mounted between the lower flanges of the frame side members 13. The rollers 44 support the belt 43 and also sustain it in driving engagement with the underside of the drive roller 29 in each of the several zones, it being understood that the main driving belt 43 is sufficiently long to span all the zones of the conveyor for constant driving of the rollers 29 in the several zones.

In operation, the main driving belt 43 constantly drives all the driving rollers 29 in the several zones of the conveyor and with the sensing rollers 16 and the clutches 33, 34 engaged, the driving sheaves 24 rotate with the rollers 29. In each individual zone the driving sheave 24 propels the driving belt 23 which is in constant contact with the transport rollers 15 and, as long as the belt 23 is propelled, the rollers 15 are rotated so as to transport an article through that zone, as for example the zone Z-1. In the meantime, other articles may be in transport through other zones of the conveyor, as for example the zone Z-2.

When the article in zone Z-1 passes over the sensing roller 16 on its way into the next following zone C-3, the sensing roller is depressed. This, through the medium of the bell crank 19 and push rod 39 in zone Z-1 disengages the clutch drive between the roller 29 and the sheave 24 driving the transport roller belt 23 in the next proceding zone Z-2, so that the transport rollers 15 in the zone C-2 are stopped and further movement of the article through the zone C-2 is arrested until the article in zone C-1 has cleared the sensing roller 16 and has passed into the zone C-3.

It will be apparent that in this manner an article must pass through one zone before an article in the next preceding or upstream zone may enter that one zone. Consequently, when an article is accidentally or intentionally stopped at any point along the length of the conveyor, all other articles behind it are also stopped at spaced apart distances corresponding to the several zones of the conveyor, and piling of such other articles against the stopped article is automatically prevented. As such, several articles may accumulate in the respective zones of the conveyor at a standstill and without piping up, until the initially stopped article has resumed its movement.

It is to be particularly noted that the disengageable drive of the transport rollers in the several conveyor zones is effected without the necessity of shifting a belt in and out of driving engagement with the rollers, as is customary in the prior art. Thus, the main driving belt 43 is always in contact with and drives the rollers 29 in the several conveyor zones. In each zone, the driving belt 23 is always in contact with the transport rollers 15, and if the belt 23 is driven, the transport rollers are also driven. If driving of the transport rollers in any particular zone is to be discontinued, the drive to the belt 23 in that zone is stopped by disengagement of the associated clutch components 33, 34, while the driving roller 29 still continues in its rotation. The constant engagement of the driving belt 23 with the transport rollers 15 in each zone assures that all the transport rollers in that zone are either uniformly rotating or at a standstill — all without regard to driving or non-driving of transport rollers in the adjacent zones. As indicated earlier, an optimum situation such as this is difficult and often impossible to attain with belt shifting arrangements of the prior art.

While in the foregoing there has been described and shown the preferred embodiment of the invention, various modifications and equivalents may be resorted to within the spirit and scope of the invention as claimed.

The embodiments of the invention in which an exclusive property or privilege is claimed are defined as follows:

1. In an accumulating type live roller conveyor, the combination of several groups of transport rollers, a depressible sensing roller between every two adjacent groups of transport rollers, said transport rollers and sensing rollers constituting an article supporting bed which is divided into a plurality of successive zones each containing one group of transport rollers and one sensing roller, a plurality of driving belts each constantly engaging the group of transport rollers in the respective zones, a common drive source, separate driving means independently propelling the respective driving belts from said common drive source, and control means responsive to depression of the sensing roller in each zone by passage of an article thereover, said control means in each zone being operative to disengage the driving means in a preceding zone so that the driving belt in the preceding zone is stopped until the depressed roller in the following zone is raised after passage of an article thereover.

2. The conveyor as defined in claim 1 which is further characterized in that the sensing roller in each zone, when depressed engages the driving belt of that zone.

3. The conveyor as defined in claim 1 wherein each zone includes a set of sheaves including a driving sheave having the driving belt of that zone trained thereover, said separate driving means including clutch means operatively connecting said driving sheave to said common drive source, said control means being operative to disengage said clutch means when the sensing roller in the following zone is depressed.

4. The conveyor as defined in claim 3 wherein said separate driving means in each zone also includes a driving roller continuously actuated by said common drive source, said clutch means being operative between said driving roller and said driving sheave.

5. The conveyor as defined in claim 4 wherein said common drive source comprises a main driving belt extending over all the zones of said article supporting bed, said main driving belt constantly engaging the driving rollers in the respective zones.

6. The conveyor as defined in claim 1 wherein each zone includes a set of sheaves including a driving sheave having the driving belt of that zone trained thereover, said common drive source comprising a main driving belt extending over all the zones of said article supporting bed, and said separate driving means for each zone comprising a driving roller continuously actuated by said main driving belt, and clutch means operatively connecting said driving sheave to said driving roller in each zone, said control means being operative to disengage said clutch means when the sensing roller in the following zone is depressed.

7. The conveyor as defined in claim 6 which is further characterized in that the sensing roller in each zone, when depressed engages the driving belt of that zone.

8. The conveyor as defined in claim 3 wherein each zone includes a set of sheaves including a driving sheave having the driving belt of that zone trained thereover, said separate driving means for each zone comprising a driving roller coaxial with said driving sheave and constantly actuated by said common drive source, and clutch means operative between said driving roller and said driving sheave, said clutch means including a projectable and retractable clutch member carried by said driving sheave, and a cooperating detent carried by said driving roller and engaged by said clutch member when the latter is projected, said control means being operative to retract and disengage said clutch member from said detent when the sensing roller in the following zone is depressed.

9. The conveyor as defined in claim 8 wherein said common drive source comprises a main driving belt extending over all the zones of said article supporting bed, said main driving belt constantly engaging the driving rollers in the respective zones.

10. The conveyor as defined in claim 8 wherein said control means in each zone includes a push rod having one end portion thereof disposed adjacent said driving sheave of that zone for retracting said clutch member, the other end of said push rod being operatively connected to the sensing roller of the following zone.

11. In an accumulating type live roller conveyor, the combination of an elongated supporting frame, several groups of transport rollers rotatably journalled in said frame, a sensing roller depressibly mounted in the frame between every two adjacent groups of transport rollers and biased to a raised position above the level of the transport rollers, said transport rollers and sensing rollers constituting an article supporting bed which is divided into a plurality of successive zones each containing one group of transport rollers and one sensing roller following the transport rollers in the direction of conveyor movement, a plurality of driving belts each constantly engaging the underside of the group of transport rollers in the respective zones, each zone including a set of sheaves including a driving sheave rotatably mounted in said frame and having the driving belt of that zone trained thereover, separate driving means for the driving sheave in each zone, said driving means including a driving roller rotatable in said frame coaxially with the driving sheave, and clutch means operative between said driving roller and the driving sheave, a common drive source comprising a main driving belt extending in said frame over all the zones of said article supporting bed and constantly engaging the underside of the driving rollers in the respective zones, and control means responsive to depression of the sensing roller in each zone by passage of an article thereover, said control means in each zone being operative to disengage said clutch means in a preceding zone so that the driving belt in the preceding zone is stopped until the depressed roller in the following zone is raised after passage of an article thereover.

12. The conveyor as defined in claim 11 which is further characterized in that the sensing roller in each zone, when depressed engages the driving belt of that zone.

13. The conveyor as defined in claim 11 wherein the clutch means of each zone includes a projectable and retractable clutch member carried by said driving sheave, and a cooperating detent carried by said driving roller and engaged by said clutch member when the latter is projected, said control means being operative to retract and disengage said clutch member from said detent when the sensing roller in the following zone is depressed.

14. The conveyor as defined in claim 13 wherein said control means in each zone includes a push rod having one end portion thereof disposed adjacent said driving sheave of that zone for retracting said clutch member, the other end of said push rod being operatively connected to the sensing roller of the following zone.

* * * * *